(No Model.)   2 Sheets—Sheet 1.

H. SPÜHL.
SPIRAL SPRING WINDING MACHINE.

No. 351,220.   Patented Oct. 19, 1886.

Witnesses.   Inventor.

(No Model.) 2 Sheets—Sheet 2.
H. SPÜHL.
SPIRAL SPRING WINDING MACHINE.
No. 351,220. Patented Oct. 19, 1886.
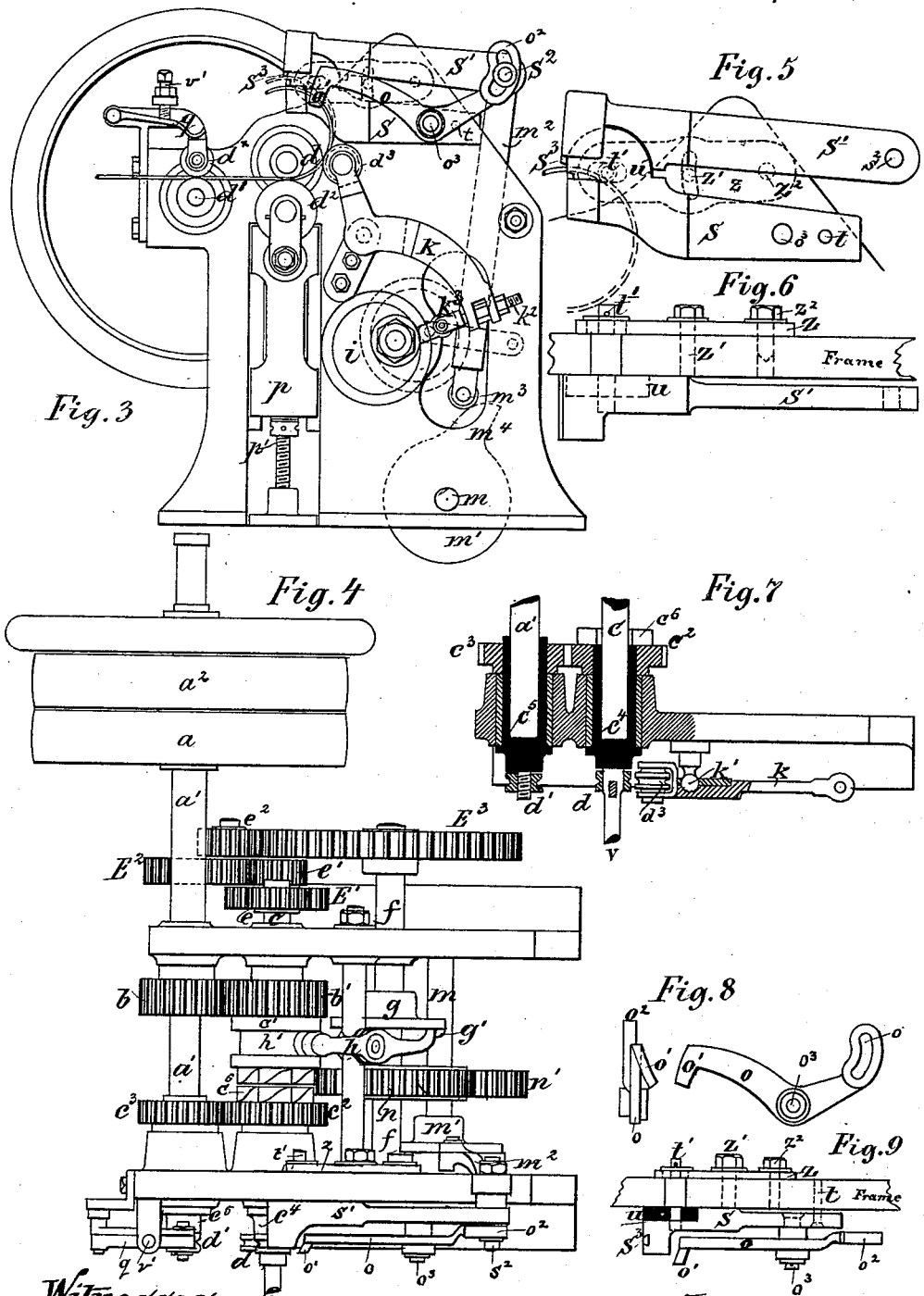

UNITED STATES PATENT OFFICE.

HEINRICH SPÜHL, OF ST. FIDEN, SWITZERLAND, ASSIGNOR OF ONE-HALF TO EMIL DEUTGEN, OF DÜREN, GERMANY.

SPIRAL-SPRING-WINDING MACHINE.

SPECIFICATION forming part of Letters Patent No. 351,220, dated October 19, 1886.

Application filed December 17, 1885. Serial No. 185,921. (No model.) Patented in Germany April 3, 1883, No. 24,810.

*To all whom it may concern:*

Be it known that I, HEINRICH SPÜHL, of St. Fiden, Switzerland, have invented a new and useful Spiral-Spring-Winding Machine, (for which I have obtained a patent in Germany, No. 24,810, bearing date April 3, 1883,) of which the following is a specification.

This invention relates to machines for making springs in cylindrical as well as in single or double conical form, as may be desired.

The invention consists in the elements of improvements hereinafter more fully pointed out.

Figure 1:
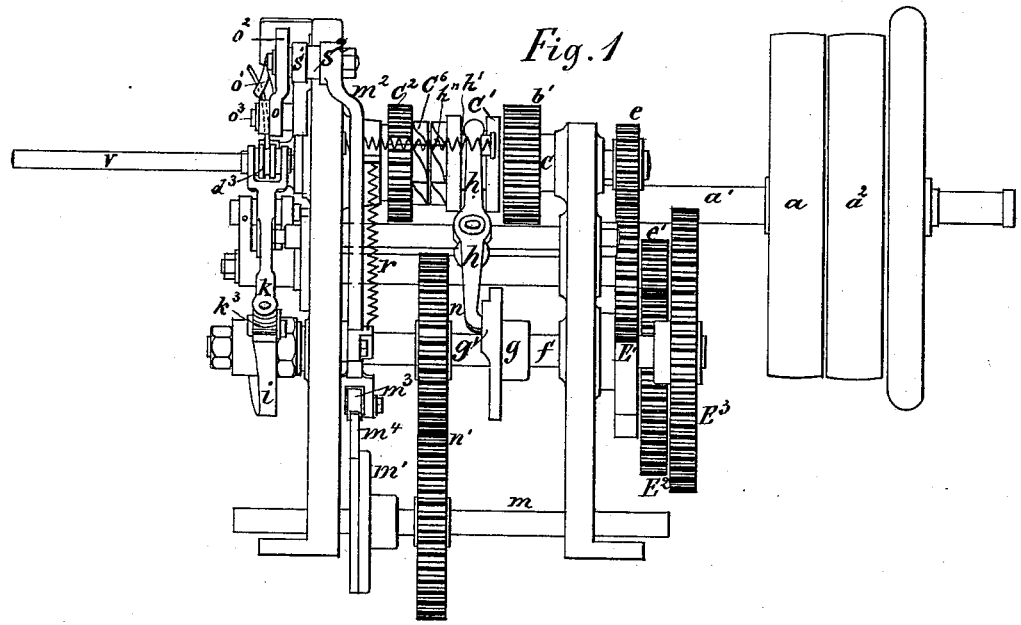
Figure 2:
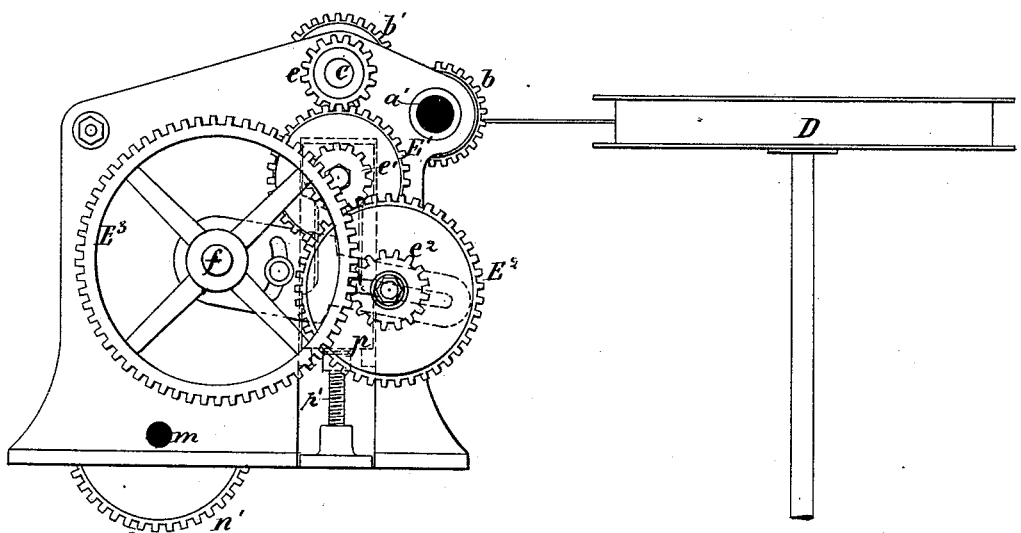

In the accompanying drawings, Figure 1 represents a rear elevation of the machine. Figs. 2 and 3 are side views on right and left hand of the machine. Fig. 4 is a top view of the same, and Figs. 5 and 6 are a front and top view of the shears on an enlarged scale. Fig. 7 is a horizontal section of the bearings for ends of shaft and feeding-rollers, as well as the bending-roller. Fig. 8 shows an end and side view, and Fig. 9 a top view of the lever $o$.

Similar letters represent similar parts in all the figures.

The main shaft $a'$ is provided with fast and loose pulleys $a$ $a^2$, through which the desired motion is communicated to the same. This shaft $a'$ carries a gear-wheel, $b$, meshing into a corresponding gear-wheel, $b'$, attached to a shaft, $c$.

Upon the shaft $c$ a sliding clutch, $c'$, is attached, the teeth of which engage with corresponding teeth, $c^6$, on the side of a wheel, $c^2$, which latter meshes into a wheel, $c^3$, communicating thereby, when the clutch $c'$ is engaged, motion to these wheels $c^2$ and $c^3$, which are of the same diameter. These wheels $c^2$ $c^3$ are fast upon sleeves $c^4$ and $c^5$, (see Fig. 7,) in which the ends of the shafts $a'$ and $c$ are supported, and said sleeves are provided on their outer ends with spindles, upon which the grooved feeding-rollers $d$ $d'$ are firmly attached. The other end of the shaft $c$ is connected through a train of wheels, $e$, $E'$, $e'$, $E^2$, $e^2$, and $E^3$, with a shaft, $f$, to give the desired motion to said shaft $f$. (See Figs. 1, 2, and 4.) Upon this shaft $f$ a disk, $g$, is fastened, having on one side a cam-shaped face, against which the pivoted lever $h$ is made to work. The other end of this lever $h$ works in a groove, $h'$, on the sliding clutch $c'$, operating so that when the lower end of the lever $h$ comes upon the raised part $g'$ of the disk $g$, this clutch $c'$ will be thrown out of connection with the teeth $c^6$ on the side of the wheel $c^2$, and thus cause the wheels $c^2$ and $c^3$ to stop, and consequently the feeding-rollers $d$ $d'$ to stop. The sliding clutch $c'$ is kept in gear with the teeth on the face of the wheel $c^2$ by means of a suitable spring, $h''$, Fig. 1, which said spring insures at the same time the constant contact of the lower end of the lever $h$ against the face of the disk $g$.

On the outer end of the shaft $f$ a disk, $i$, Fig. 3, is firmly attached eccentrically, having its outer side face near the periphery cam-shaped, thus forming a double cam. Against this disk $i$ a flanged roller, $k^3$, attached to the lower end of the pivoted lever $k$, is made to work. The cylindrical part of this roller $k^3$ works upon the circumference of the disk $i$, and its flange bears against the cam-shaped side of said disk, which insures a longitudinal as well as side motion of the lever $k$. This roller $k^3$ is attached to the end of the pivoted lever $k$ by means of a regulating-screw, $k^2$, for the purpose hereinafter described. The other end of this lever $k$ carries a grooved wheel, $d^3$. The wire passing between the feed-rollers $d'$ $d^\times$ and $d$ $d^2$ comes in contact with this grooved roller $d^3$, and is thereby bent to the proper form. In accordance with the distance of this wheel $d^3$ from the roller $d$ the diameter of each coil of the spring will be regulated, the amount of motion of said wheel $d^3$ being regulated by the size and shape of the circumference of the disk $i$. The amount of side twist to be given to the wire, or the regular distance of one coil from the other, is produced by the side motion given to the roller $d^3$, resulting from the shape of the cam-surface on the side of the disk $i$ and communicated through the flange of the roller $k^3$ to the lever $k$. According to the hardness or softness of the wire, the wheel $d^3$ will require to be nearer to or farther away from the roller $d$.

This I obtain by the regulating-screw $k^2$, by which the roller $k^3$ is attached to the end of the lever $k$.

Into the end of the sleeve $c^4$ a rod, $v$, is attached, extending some distance outward and central with the roller $d$. The spring formed by the action of rollers $d$, $d^2$, and $d^3$ passes around this rod $v$, and is supported by the same.

The side twist of the wire being regulated by the shape of the cam-surface on the side of the disk $i$, as above mentioned, it will readily be understood that by the shape of this side surface the directions of the wire at the beginning and at the end of each spring may be so regulated that the ends of the spring can be perfectly square with its axis, to insure thereby square ends, and consequently a perfect action of the spring.

The speed of the shaft $f$ must be so regulated that the same will make one revolution during the time required to make a complete spiral spring of any desired size and length. This desired speed can be obtained by changing the pinion $e^2$ in the train of gearing through which the shaft $f$ receives its motion from the shaft $c$. To allow the forward and backward or reciprocating motion as well as the side or lateral motion of the lever $k$, the same is pivoted upon a ball-joint, $k'$, Fig. 7, which enables the free motion of this lever $k$ in a vertical or horizontal direction.

The wire coming from a suitable drum, D, Fig. 2, passes over the feed-roller $d'$, being pressed into the groove in said roller, and at the same time receiving the desired friction or tension by means of a friction-roller, $d^\times$, attached to a pivoted arm, $q$, Fig. 3, and acted upon by a screw, $v'$, or by a suitable spring arrangement. The wire passes then below the feeding-roller $d$, where the same is retained in the groove in said roller and receives at the same time the required tension by the friction-wheel $d^2$, journaled in the sliding block $p$, regulated by the screw $p'$. The wire passes then into the groove of the wheel $d^3$, and receives through the action of the same the desired shape for the required spring.

Upon the shaft $f$ a wheel, $n$, is firmly attached, meshing into a wheel, $n'$, of the same diameter, fast on a shaft, $m$. This shaft $m$ carries a cam, $m'$, which operates the rod $m^2$ through roller $m^3$. This rod $m^2$ is attached to the upper arm of shears $s'$, by which the wire is cut when the spring is finished. According to the diameter of the spring, these shears must be fixed higher or lower on the frame of the machine.

The shears for cutting the wire when the spring is finished consists of the arms $s$ and $s'$. During the time the roller $m^3$ passes over the circular surface of the cam $m'$ no motion will be communicated to this upper arm, $s'$, and when the roller $m^3$ comes in contact with the nose $m^4$ of the cam $m'$ this arm $s'$ will be moved so that its cutting-edge $s^3$ will act upon the wire and cut the same. The lower arm, $s$, is at one end attached, through bolt $t$, to the main frame of the machine, and at its other end, through bolt $t'$, to a movable frame, $z$, attached to the frame of the machine. The frame $z$ is made to turn on its bolt $z^2$, and is secured in any desired position by the bolt $z'$ passing through a slot in the frame $z$. By changing the inclination of the frame $z$ the bolt $t'$, to which the arm $s$ is attached, can be raised or lowered, and consequently the cutting end of the shears raised or lowered to correspond with the diameter of the spring to be cut off. The arm $s'$ turns likewise upon the bolt $t'$, and is provided with a circular recess, $u$, concentric with the bolt $t'$, fitting upon a corresponding projection on the arm $s$. (See Figs. 5 and 9.)

The bolt $s^2$, which connects the rod $m^2$ with the arm $s'$, passes through a circular slot, $o^2$, at one end of a lever, $o$, turning upon a bolt, $o^3$, fast in the arm $s$. The other end of this lever $o$ is provided with a nose, $o'$, bent sidewise outwardly. When the upper arm, $s'$, of the shears is being operated, and before its cutting-knife $s^3$ has moved sufficiently down to act upon the wire, this lever $o$ is moved downward, so that its outwardly-bent nose $o'$ passes the wire and forces the same under the knife $s^3$, ready to be cut when the arm $s'$ completes its motion.

When the formation of the spring is completed, the projecting part $g'$ of the cam $g$ acts upon the lever $h$ to disengage the clutch $c'$, and thereby stops the motion of the wheels $c^2$ and $c^3$, as well as of the sleeves $c^4$ and $c^5$, and consequently of the feeding-rollers $d$ $d'$ during the time the shears operate, so as to cut off the finished spring in the manner above described, after which the action of the spring $h^2$ throws the clutch again in gear with the wheel $c^2$, and the above-described operation is repeated.

What I claim as my invention, and desire to secure by Letters Patent, is—

1. The combination of sleeves $c^4$ $c^5$, supporting the ends of the shafts $a'$ $c$ and carrying gear-wheels $c^2$ $c^3$, and feeding-rollers $d$ $d^2$ $d^\times$ $d'$ with clutch $c'$, shaft $c$, lever $h$, and disk $g$, with raised part $g'$, fast on shaft $f$, and means for operating the shafts $c$ and $f$, substantially as set forth.

2. In combination with the feeding-rollers $d$ $d^2$ $d^\times$ $d'$, the roller $d^3$, journaled in the upper end of lever $k$, the movable flanged roller $k^3$ at the lower end of said lever $k$, and double cam $i$ and shafts $f$, arranged to operate substantially as and for the purpose described.

3. The combination of shaft $m$, carrying cam $m'$, with rod $m^2$, connected to lever $o$ and arm $s'$ of the shears, and means for operating the shaft $m$, substantially as and for the purpose specified.

4. The combination of the lever $k$, carrying roller $d^3$ and receiving reciprocating and lateral motion, with the rollers $d$ $d^2$ $d^\times$ $d'$, all being so constructed that the roller $d^3$ bends the wire while the rollers $d$ $d^2$ $d^\times$ $d'$ feed the wire to said roller $d^3$, substantially as described.

5. The combination of the bending-roller $d^3$, feeding-rollers $d\ d^2\ d^\times\ d'$, clutch $c'$, lever $h$, disk $g$, with raised part $g'$, and arm $s'$ of the shears, with changeable gearing connecting shafts $c$ and $f$, and gearing $n\ n'$, connecting shaft $f$ and $m$, all being arranged to operate in the manner described, and so constructed that clutch $c'$ throws the feeding-rollers out of motion before and during the operation of the shears, substantially as specified.

6. The combination of the arm $s'$ of the shears, receiving motion from the cam $m'$, with the lever $o$, receiving motion from the same cam $m'$, and arranged to operate in the manner and for the purpose substantially as described.

In testimony whereof I have signed this specification in the presence of two subscribing witnesses.

HEINRICH SPÜHL.

Witnesses:
M. M. STAUB,
J. E. KIRBELY-GRAY.